United States Patent [19]

Rigler et al.

[11] 4,407,977

[45] Oct. 4, 1983

[54] FIRE RETARDANT PARTICULATE EXPANDABLE STYRENE POLYMERS

[75] Inventors: Josef K. Rigler, Recklinghausen; Ekkehard Wienhöfer, Marl; Horst Leithäuser, Marl; Karl Trukenbrod, Marl, all of Fed. Rep. of Germany

[73] Assignee: Chemische Werke Hüls Aktiengesellschaft, Marl, Fed. Rep. of Germany

[21] Appl. No.: 380,071

[22] Filed: May 20, 1982

[30] Foreign Application Priority Data

Jun. 5, 1981 [DE] Fed. Rep. of Germany ....... 3122341

[51] Int. Cl.$^3$ .............................. C08J 9/20; C08J 9/22
[52] U.S. Cl. ......................................... 521/56; 264/53; 264/DIG. 9; 264/DIG. 15; 521/58; 521/90; 521/146
[58] Field of Search .................... 521/90, 56, 58, 146; 264/53, DIG. 9, DIG. 15

[56] References Cited

U.S. PATENT DOCUMENTS 3,755,209  8/1973  Nintz et al. .
4,029,614  6/1977  Nintz et al. .
4,192,922  3/1980  Mixich et al. .
4,228,244  10/1980  Rigler et al. .
4,281,036  7/1981  Leithäuser et al. .

FOREIGN PATENT DOCUMENTS 1425730  6/1973  United Kingdom .

OTHER PUBLICATIONS

Weigert in Chemikerzeitung #99 (1975) pp. 108–110.

Primary Examiner—Morton Foelak
Attorney, Agent, or Firm—Wells & Wells

[57] ABSTRACT

Fine particulate expandable flame retardant styrene polymers having an improved minimum mold dwell time and reduced block shrinkage are prepared by:

(a) mixing together styrene monomer or a mixture of styrene and a copolymerizable monomer with an organic halogen compound and an expanding agent in an aqueous dispersion;

(b) adding before or during polymerization to the mixture of (a) from 0.0001 to 0.1% by weight of an expoxidation product of an aliphatic hydrocarbon of which the epoxidated aliphatic chain comprises from 6 to 18 C atoms, this epoxidation product being soluble in the monomers;

(c) carrying out a polymerization in the aqueous suspension of (a) and (b) using radical forming initiators at temperatures of 80° C.–130° C. to form expandable particles;

(d) pre-forming the expandable particles resulting from (c);

ageing the pre-formed particles of (d); and (f) molding the pre-formed and aged particles of (e) in a pressure resistant mold.

6 Claims, No Drawings

FIRE RETARDANT PARTICULATE EXPANDABLE STYRENE POLYMERS

CROSS-REFERENCES TO RELATED APPLICATIONS

Applicants claim priority under 35 USC 119 for application No. P 31 22 341.9, filed June 5, 1981 in the Patent Office of the Federal Republic of Germany.

The disclosure of assignee's copending application Ser. No. 206,282 filed Nov. 12, 1980, now U.S. Pat. No. 4,337,319, is incorporated herein to further show the state of the art of self extinguishing fine particulate expandable styrene polymers.

BACKGROUND OF THE INVENTION

The field of the invention is fire retardant, fine particulate, expandable styrene polymers for the preparation of molded articles. The present invention is particularly concerned with expandable, particulate molding compositions of styrene polymers containing organic halogen compounds and an epoxidation product.

The state of the art of expandable polystyrene may be ascertained by reference to the Kirk-Othmer, "Encyclopedia of Chemical Technology," 2nd Edition, Vol. 9 (1966) under the section entitled "Foamed Plastics," pages 847–884, particularly pages 852, 853 and 855 where polystyrene is disclosed, and Vol. 19 (1969) under the section entitled "Styrene Plastics," pages 85–134, particularly pages 116–120, where polystyrene foams are disclosed and pages 120, 121 where prior art self-extinguishing polystyrene foams are disclosed and U.S. Pat. Nos. 3,755,209; 4,029,614; 4,192,922; 4,228,244 and 4,281,036 the disclosures of which are incorporated herein.

The preparation of the epoxidation additives useful in the present invention is disclosed in West German Published Application No. 2,436,817; the article by Swern in Organic Peroxides, Vol. II, pp. 355–533 (1971) and the article by Weigert in Chemikerzeitung #99 at page 109 (1975).

Shaped articles of foamed material are produced commercially by expanding fine particulate expandable styrene polymers in molds. In this procedure, the fine-particulate styrene polymers are first heated with steam or hot gases to temperatures above their softening points and as a result thereof foaming into discrete particles takes place. This process step, wherein the particles have room for free expansion, is called pre-foaming as disclosed in U.S. Pat. No. 4,228,244. The pre-foamed styrene polymers first are stored and then are further expanded in a pressure-resistant mold, which however is not gas-tight, by renewed heating with steam. Due to spatial limitations, the particles fuse together into a molded body corresponding to the cavity of the mold used. This second process step is termed final foaming as also disclosed in U.S. Pat. No. 4,228,244. The molded object, after final foaming, is cooled inside the mold until the inside temperature drops below the softening point. Otherwise, deformation is incurred. The time interval allowing the earliest removal of the molded object from the mold without deformation is ordinarily call the "minimum mold dwell time". It is also possible to use as a measurement, the drop in the inside mold pressure to near atmospheric as a criterion for removing the shaped object from the mold. After being removed from the mold, the molded object most often is stored until fully cooled and thereafter it can be cut into foamed sheets or panels for use as thermal insulation.

Especially when flame retardant organic halogen compounds are added, the production of expandable styrene polymers often results in products having irregular cell structures. Such foamed blocks tend to a significant collapse of their sides (block shrinkage) some time after being removed from the mold, and furthermore they are also less fused inside the block. Consequently foamed panels cut from a block are of varying grades. Furthermore the blocks having defective sides must be trimmed, whereby an undesired waste is incurred.

Another limitation exists in relation to pre-foaming. Part of the pre-foaming beads shrink and accordingly the low densities desired cannot be achieved. The shrinkage of the prefoam beads is related to a high loss in expanding agent, whereby the above mentioned uneven fusing, takes place and hence the collapse of the blocks at the sides is enhanced. Furthermore, the surface of the finished objects has an uneven appearance, which is particularly bothersome for the manufacture of panels which are visible to the public.

U.S. Pat. No. 3,755,209 discloses that by adding hydroxylamines to expandable styrene polymers made self-extinguishing by halogen compounds, it is possible to improve the above cited processing problems. U.S. Pat. No. 4,029,614 discloses a similar effect by adding slight amounts of amines free of hydroxyl groups, and U.S. Pat. No. 4,192,922 defines amine-substituted triazine derivatives for remedying these known processing problems.

SUMMARY OF THE INVENTION

It is true that the additives disclosed in U.S. Pat. Nos. 3,755,209; 4,029,614 and 4,192,922 often improve the product quality significantly.

Nevertheless they still fail to provide fully satisfactory products. The poor reproducibility of the properties of the product is most bothersome of all.

It is an object of the present invention to provide compounds which, in low concentrations, will prevent the occurrence of the above mentioned drawbacks such as uneven cellularity, fusing and block shrinkage. Moreover such compound additives should not be degraded, as regards effectiveness, by the auxiliary materials required for polymerization such as initiators, suspension-assisting agents or other additives such as flame proofing agents or expanding agents, whereby the product quality achieved is reproducible.

It has been found, according to the present invention, that epoxidation products of aliphatic hydrocarbons which are soluble in the monomers to be polymerized and of which the epoxidated aliphatic chain comprises from about 6 to 18 carbon atoms, particularly from 10 to 14 carbon atoms, favorably affect the important processing properties of "fusing quality" and "block shrinkage" of foamed blocks made from styrene polymers containing expandable, organic halogen compounds. These epoxidation products are also free from the above mentioned limitations relating to amine addition. The styrene polymers obtained by the present invention offer greater processing latitude, that is, foamed blocks having good fusing and excellent surfaces are always obtained for various steam pressures when they are final foamed in the mold.

According to the present invention expanded, flame retardant, styrene polymers having an improved minimum mold dwell time and reduced block shrinkage are prepared by:

(a) mixing together styrene or a mixture of styrene and a copolymerizable monomer with an organic halogen compound and an expanding agent in an aqueous dispersion;

(b) adding before or during polymerization to the mixture of (a) in proportions of 0.0001 to 1%, preferably from 0.001 to 0.1% by weight referred to the monomers to be polymerized of an epoxidation product of an aliphatic hydrocarbon having an epoxidated chain containing from 6 to 18 carbon atoms, this epoxidation product being soluble in the organic phase of the suspension (the monomers);

(c) carrying out a polymerization in the aqueous suspension of (a) and (b) using radical forming initiators at temperatures of 80° C.–130° C. to form expandable particles;

(d) pre-foaming the expandable particles resulting from (c);

(e) ageing the pre-foamed particles of (d); and (f) molding the pre-foamed and aged particles of (e) in a pressure resistant mold.

DESCRIPTION OF THE PREFERRED EMBODIMENTS

The epoxidation products of aliphatic hydrocarbons conceived according to the present invention are both those obtained from straight chain and from branched hydrocarbons. The epoxy group can be present both as a terminal group and within the chain, also in single or multiple foam.

Suitable epoxidation products are for instance 1,2-epoxyhexane, 3,4-epoxyheptane, 1,2-epoxyoctane, 1,2-epoxydecane, 1,2-epoxyundecane, 1,2-epoxydodecane, 1,2-epoxytetradecane, 1,2-epoxyhexadecane, 1,2-epoxyoctadecane, in particular 1,2-epoxydodecane, 1,2-epoxytetradecane, 1,2-epoxyhexadecane, branched-chain 1,2-epoxy-2-butylocane and 1,2-epoxybutyldecane.

Again the epoxidation products may be based on mixtures of hydrocarbons such as the corresponding $C_{12}/C_{13}$ blends and products designated as $\mu$-$C_{12}/C_{13}$-epoxyalkanes comprise both terminal epoxy groups and epoxy groups distributed over the chain.

The following epoxidation products with multiple epoxy groups are illustrative: 1,2,5,6-bis-epoxyhexane, 1,2,9,10-bis-epoxydecane and 1,2,7,8-bis-epoxyoctane.

These epoxidation products are known to the prior art and no protection is claimed for the production of the epoxidation products within the scope of the present invention. Their production takes place by prior art methods such as disclosed by Swern in Organic Peroxides, Vol II, pp. 355–533 (1971) or in West German Published Application No. 2,436,817, especially as disclosed by Weigert in Chemikerzeitung #99, page 109 (1975).

A suitable method for preparing the styrene polymers of the present invention which contain an organic halogen compound and also an expanding agent is carried out according to the prior art by polymerizing styrene or a mixture of styrene and comonomers polymerizable therewith in an aqueous suspension using radical-forming initiators at temperatures in excess of 80° C. The suspension polymerization is carried out in the presence of the flame-retarding organic halogen compounds and the expanding agents and the epoxidation product soluble in the organic phase of the suspension is added to the aliphatic hydrocarbons before or during the polymerization.

As disclosed in U.S. Pat. No. 4,228,244 the radical forming initiators include benzoylperoxide, laurylperoxide, ter.-butylperbenzoate, ter.-butylyseroctate, di-ter.-butylperoxide or mixtures as well as unstable azo compounds such as azobisisobutyronitrite. These initiators generally are used in proportions between 0.01 and 1% by weight referred to the monomers. The temperature of polymerization is preferably between 80° C. and 130° C.

Definite factors regarding the effectiveness of the epoxidation products used include:

(a) good solubility of the epoxidation products in the organic phase of the suspension and (b) good solubility of the organic halogen compound (flame proofing means) in the epoxidation products.

The epoxide products of the present invention are used in proportions of about 0.0001 to 1, preferably however from 0.001 to 0.1% by weight referred to the weight of monomers to be polymerized. In every instance the amount to be used, measured with respect to the amount of the organic halogen compound added, is small. The substances can be added either to the organic phase or to the reaction mixture before or during polymerization up until the end of the polymerization. The preferred addition of the epoxide products is during the polymerization conversion of 50 to 90%. This addition is made possible together with the expanding agent. The amount of epoxide, and the time of the addition, is each independent of the temperature profile of the polymerization and independent of the kind of the respective initiator used. The amount and the kind of epoxide however depends on the kind of halogen compound incorporated and this is easily ascertained empirically.

The raw materials for the production of the styrene polymers of the present invention are mixtures of monomers containing at least 50% by weight of styrene and possibly components copolymerizable therewith for instance alpha-methylstyrene, nuclear-halogenated styrenes, acrylonitrile, esters of acrylic- or methacrylic acid with alcohols having 1 to 8 C atoms, N-vinyl compounds such as N-vinylcarbazole, and also slight amounts of butadiene or divinylbenzene.

The organic halogen compounds used as flame retardant agents are especially bromine compounds such as brominated oligomers of butadiene or of isoprene, at an average degree of polymerization from 2 to 20, the bromination being full or partial. Examples are 1,2,5,6-tetrabromocyclooctane, 1,2,5,6,9,10-hexabromocyclododecane, brominated polybutadiene with a polymerization degree for instance of 3 to 15. The organic halogen compounds may be contained in the expandable styrene polymer in proportions of 0.05 to 1% by weight, when added as flame-proofing agents in proportions of 0.4 to 3% by weight to the expandable styrene polymer. In addition to the halogen compounds as the flame proofing means, the known synergists can be used in conventional amounts, preferably organic peroxides, in particular those having a half-value time of at least two hours at 373° K.

The suspension stabilizers used are suitably organic protective colloids such as polyvinyl alcohol, polyvinyl pyrrolidone or polyvinyl pyrrolidone copolymers or mineral suspension auxiliaries such as finely distributed tricalcium phosphate, barium phosphate, etc.

The expanding agents used in the process of the invention are for instance such aliphatic hydrocarbons as propane, butane, pentane, hexane, cycloaliphatic hydrocarbons such as cyclohexane, or halogen hydrocarbons such as dichlorodifluoromethane and 1,2,2-trifluoro-1,1,2-trichloroethane. Mixtures of such compounds can also be used. The proportion of expanding agents used is 3 to 15% by weight, preferably between 5 and 8% by weight referred to the styrene polymer.

The expandable styrene polymers moreover can contain such additives as dyes, fillers and stabilizers. Once prepared, the expandable polymers are present in fine-particulate form conventionally as beads and in general are 0.4 to 3 mm in diameter. The pre-foamed expandable styrene beads are further foamed by the conventional final foaming method by being heated in molds which close without being gas-tight and are sintered into foamed shapes corresponding in their dimensions to the inside cavity of the molds used. The styrene polymers of the present invention can be processed into extraordinarily dimensionally stable shaped bodies. Once removed from the mold, foam blocks $1 \times 1 \times 0.5$ m show only an extremely slight tendency to have collapsing sides. The foam shapes or blocks are further characterized by an especially good fusing of the individual particles. Accordingly they evince an especially good mechanical stability.

EXAMPLES

A mixture of 100 parts by weight of fully desalted water, 100 parts by weight of styrene, 0.4 parts by weight of benzoyl peroxide, 0.1 parts by weight of tertiary butyl perbenzoate, 0.75 parts by weight of hexabromocyclododecane, 0.30 parts by weight of dicumyl peroxide and the amount listed in Table 1 of the corresponding epoxy alkanes (dissolved in styrene) was heated with stirring to 90° C. in a pressure-resistant agitation vessel made of a corrosion-proof steel. This is true in every case of the examples tabulated. After 2 hours heating at 90° C., 5 parts of a 2% aqueous solution of polyvinyl alcohol having a saponification number of 140 is added. After another 2 hours, 7 parts by weight of a mixture of 25 parts by weight of isopentane and 75% by weight of n-pentane are added within 10 to 15 minutes. This mixture is heated, after another hour, to 90° to 120° C. and is kept at this temperature for 6 hours.

Following the termination of the polymerization cycle, cooling is carried out, the bead polymer so obtained is separated from the aqueous phase, dried and sifted.

The bead fraction between 1 and 2 mm in diameter is prefoamed in a continuous Rauscher type agitation pre-foamer with flowing steam to a bulk weight of 15 grams/liter, then was interim-stored or aged for 24 hours and next was foamed out into a foam block mold of the size $100 \times 50 \times 100$ cm type Rauscher at various vapor pressures. Table 1 lists the test values. Each example is repeated at least five times. The standard deviations are shown next to the test values and these standard deviations are quite clearly higher for the control tests than for the examples of the invention.

TABLE 1

| Additive | Additive Amount % By Weight | Addition in Bulk Weight g/l[1] | Steaming Time Sec.[2] | Vapor Pressure bar[3] | Degree of Fusing %[4] | Block Shrinkage %[5] | Block Surface[6] | Cell Structure Cells/mm[7] |
|---|---|---|---|---|---|---|---|---|
| 1. Example of the invention | | | | | | | | |
| μ-C$_{12}$/C$_{13}$— | 0.01 | 0.4 ± 0.2 | 20 | 1.8 | 80 ± 10 | 0.4 ± 0.2 | Good | 4 to 6 |
|  |  |  | 50 | 1.5 | 90 ± 10 | 0.3 ± 0.1 | Good | 4 to 6 |
| epoxy alkane | 0.005 | 0.8 ± 0.2 | 20 | 1.5 | 80 ± 10 | 0.5 ± 0.2 | Good | 4 to 6 |
|  |  |  | 20 | 1.8 | 80 ± 10 | 0.6 ± 0.2 | Good | 4 to 8 |
|  |  |  | 50 | 1.5 | 80 ± 10 | 0.6 ± 0.2 | Good | 4 to 8 |
|  |  |  | 20 | 1.5 | 70 ± 20 | 0.6 ± 0.2 | Good | 4 to 8 |
| 1,2,9,10-bis-Epoxy decane | 0.005 | 0.5 ± 0.2 | 20 | 1.8 | 80 ± 10 | 0.5 ± 0.3 | Good | 4 to 8 |
| 1,2-epoxy-tetradecane | 0.005 |  | 20 | 1.8 | 80 ± 10 | 0.4 ± 0.2 | Good | 4 to 8 |
| μ-C$_{12}$/C$_{13}$—Epoxy alkane dissolved in pentane | 0.005 | 0.4 ± 0.2 | 20 | 1.8 | 80 ± 10 | 0.4 ± 0.2 | Good | 4 to 6 |
|  |  |  | 50 | 1.5 | 90 ± 10 | 0.3 ± 0.1 | Good | 4 to 6 |
|  |  |  | 20 | 1.5 | 80 ± 10 | 0.5 ± 0.2 | Good | 4 to 6 |
| 2. Control tests | | | | | | | | |
| N,N—Dicyclohexylamine | 0.005 | 0.5 ± 0.2 | 20 | 1.8 | 70 ± 30 | 0.5 ± 0.5 | Good | 2 to 10 |
|  |  |  | 20 | 1.5 | 60 ± 40 | 0.7 ± 0.5 | Good | 2 to 10 |
| N—Tetradecylamine | 0.005 | 0.4 ± 0.2 | 20 | 1.8 | 60 ± 40 | 0.8 ± 0.7 | Good | 2 to 10 |
|  |  |  | 20 | 1.5 | 70 ± 20 | 0.6 ± 0.6 | Good | 2 to 10 |
| 2,4-Diamino-6-nonyl-1,3,5-triazine | 0.005 | 0.8 ± 0.4 | 20 | 1.8 | 60 ± 40 | 1.0 ± 0.5 | Good | 10 to 20 |
|  |  |  | 20 | 1.5 | 70 ± 30 | 1.2 ± 0.6 | Good | 10 to 20 |
| Bis-(hydroxiethyl)-dodecylamine | 0.05 | 1.0 ± 0.5 | 20 | 1.8 | 60 ± 40 | 1.5 ± 0.5 | Good | 2 to 10 |
|  |  |  | 20 | 1.5 | 60 ± 40 | 1.3 ± 0.5 | Good | 2 to 10 |

[1] addition in bulk weight of the prefoamed beads following pneumatic conveyance into a silo and after 24 hours of interim storage
[2] the steaming time is the time from the stated steam pressure being reached in the block mold until the steam supply valves are closed
[3] steam pressure in the block mold
[4] the fusing degree is the ratio of the number of torn particles to the total number of particles multiplied by 100 (= %); the test object is a foam panel 100 × 100 × 5 cm in size
[5] block shrinkage is the collapse of the sides when measured 24 hours after production of the block by measuring the block thickness from the center of a large side to the opposite one and at right angles to both; the difference between the inside mold dimension at this location and the block thickness at this site in percent of the inside mold dimension is the block shrinkage
[6] the block surface is designated as "good" when no collapsed beads with a molten appearance can be observed thereon
[7] the microscopic determination of the cell number is determined by taking panels from ten different sites of the block in every test; the values stated are always the highest and lowest cell numbers found; the closer the values to each other, the more homogeneous is the cell structure of the block

We claim:

1. In a process for the preparation of shaped bodies based on expanded styrene polymers comprising: the polymerization of styrene or a mixture thereof with at least one monomer copolymerizable therewith in a suspension having an organic phase, the addition of an expanding agent and a fire retardant organic halogen compound, pre-forming of the resulting expandable particles, ageing of the formed particles, and molding thereof in a pressure resistant mold, the improvement comprising:

adding to the polymerization about 0.0001 to 0.1 percent by weight based on said monomers and comonomers of an epoxidation product of an aliphatic hydrocarbon having an epoxidated aliphatic chain containing from 6 to 18 C atoms, said epoxidation product being soluble in said organic phase.

2. The process of claim 1, wherein said epoxidation product is added before the polymerization.

3. The process of claim 1, wherein said epoxidation product is added during the polymerization.

4. The process of claim 1, wherein about 0.001 to 0.05 percent by weight of said epoxidation product is added.

5. The process of claim 1, wherein said epoxidation product is selected from the group consisting of 1,2-epoxyhexane, 3,4-epoxyheptane, 1,2-epoxyoctane, 1,2-epoxydecane, 1,2-epoxyundecane, 1,2-epoxydodecane, 1,2-epoxytetradecane, 1,2-epoxyhexadecane, 1,2-epoxyoctadecane, in particular 1,2-epoxydodecane, 1,2-epoxytetradecane, 1,2-epoxyhexadecane, branched-chain 1,2-epoxy-2-butyloctane, 1,2-epoxybutyldecane, 1,2,5,6-bis-epoxyhexane, 1,2,9,10-bis-epoxydecane and 1,2,7,8-bis-epoxyoctane.

6. The shaped bodies obtained by the process of claim 1.

* * * * *